(12) United States Patent
Gajda et al.

(10) Patent No.: US 9,104,838 B2
(45) Date of Patent: Aug. 11, 2015

(54) CLIENT TOKEN STORAGE FOR CROSS-SITE REQUEST FORGERY PROTECTION

(71) Applicants: Damian Gajda, Santa Clara, CA (US); Kenneth William Shirriff, Redwood City, CA (US)

(72) Inventors: Damian Gajda, Santa Clara, CA (US); Kenneth William Shirriff, Redwood City, CA (US)

(73) Assignee: GOOGLE INC., Mountain View, CA (US)

( * ) Notice: Subject to any disclaimer, the term of this patent is extended or adjusted under 35 U.S.C. 154(b) by 72 days.

(21) Appl. No.: 13/677,284

(22) Filed: Nov. 14, 2012

(65) Prior Publication Data

US 2014/0137248 A1    May 15, 2014

(51) Int. Cl.
| | |
|---|---|
| G06F 11/00 | (2006.01) |
| G06F 12/14 | (2006.01) |
| G06F 21/00 | (2013.01) |
| G06F 21/44 | (2013.01) |
| H04L 29/06 | (2006.01) |
| G06F 17/30 | (2006.01) |

(52) U.S. Cl.
CPC .............. *G06F 21/00* (2013.01); *G06F 21/445* (2013.01); *H04L 63/10* (2013.01); *H04L 63/14* (2013.01); *G06F 17/30386* (2013.01); *H04L 63/08* (2013.01); *H04L 63/12* (2013.01); *H04L 63/1441* (2013.01)

(58) Field of Classification Search
CPC ..... H04L 63/10; H04L 63/14; H04L 63/1441; H04L 63/08; H04L 63/12; G06F 21/445; G06F 17/30386
See application file for complete search history.

(56) References Cited

U.S. PATENT DOCUMENTS

| | | | |
|---|---|---|---|
| 6,026,375 A | 2/2000 | Hall et al. | |
| 6,298,125 B1 | 10/2001 | Goldberg et al. | |

(Continued)

FOREIGN PATENT DOCUMENTS

| | | |
|---|---|---|
| JP | 11-328222 | 11/1999 |
| JP | 2001-223712 | 8/2001 |

(Continued)

OTHER PUBLICATIONS

Bosse, "Distributed Agent-Based Computing in Material-Embedded Sensor Network Systems with the Agent-On-Chip Architecture," 2014, IEEE, vol. 14 Iss. 7, p. 2159-2170.*

(Continued)

*Primary Examiner* — Eleni Shiferaw
*Assistant Examiner* — Demaris Brown
(74) *Attorney, Agent, or Firm* — Johnson, Marcou & Isaacs, LLC

(57) ABSTRACT

Systems and methods can secure against cross-site request forgery using client-side token storage. A client browser can initiate an action associated with a first web service and generate a token. The token may be stored in client-side storage at the computing device. An indicator of the action may also be stored within the client-side storage. A return link, associated with a passed copy of the token, may be generated. The client may perform the redirect and return to the first web service according to the return link. The passed copy of the token can be extracted from the return link. The indicator of the action and the stored token may be loaded from the client storage. The passed copy of the token and the stored token may be compared. The action according to the indicator of the action may be performed in response to the comparison matching.

21 Claims, 4 Drawing Sheets

(56) References Cited

U.S. PATENT DOCUMENTS

| | | |
|---|---|---|
| 6,414,635 B1 | 7/2002 | Stewart et al. |
| 6,490,432 B1 | 12/2002 | Wegener et al. |
| 6,587,835 B1 | 7/2003 | Treyz et al. |
| 7,062,469 B2 | 6/2006 | Meyers et al. |
| 7,519,470 B2 | 4/2009 | Brasche et al. |
| 7,529,850 B2 | 5/2009 | Verma et al. |
| 7,676,369 B2 | 3/2010 | Fujimoto et al. |
| 7,865,308 B2 | 1/2011 | Athsani et al. |
| 8,229,473 B1 | 7/2012 | De La Rue |
| 2001/0001145 A1 | 5/2001 | Barnett et al. |
| 2001/0014868 A1 | 8/2001 | Herz et al. |
| 2002/0095333 A1 | 7/2002 | Jokinen et al. |
| 2002/0133424 A1 | 9/2002 | Joao |
| 2003/0004802 A1 | 1/2003 | Callegari |
| 2003/0004831 A1 | 1/2003 | Owens |
| 2003/0005056 A1 | 1/2003 | Yamamoto et al. |
| 2003/0050863 A1 | 3/2003 | Radwin |
| 2003/0220835 A1 | 11/2003 | Barnes, Jr. |
| 2004/0030887 A1* | 2/2004 | Harrisville-Wolff et al. .. 713/155 |
| 2004/0123154 A1* | 6/2004 | Lippman et al. ............... 713/201 |
| 2004/0181461 A1 | 9/2004 | Raiyani et al. |
| 2004/0215517 A1 | 10/2004 | Chen et al. |
| 2005/0029342 A1 | 2/2005 | Sugimoto et al. |
| 2005/0209921 A1 | 9/2005 | Roberts et al. |
| 2007/0275736 A1 | 11/2007 | Baek et al. |
| 2007/0281690 A1 | 12/2007 | Altman et al. |
| 2008/0076451 A1 | 3/2008 | Sheha et al. |
| 2008/0248815 A1 | 10/2008 | Busch |
| 2009/0047972 A1 | 2/2009 | Neeraj |
| 2009/0167553 A1 | 7/2009 | Hong et al. |
| 2009/0248804 A1* | 10/2009 | Ohtani ........................ 709/204 |
| 2009/0307096 A1 | 12/2009 | Antonellis |
| 2010/0017126 A1 | 1/2010 | Holcman et al. |
| 2010/0042735 A1* | 2/2010 | Blinn et al. .................. 709/229 |
| 2010/0107225 A1* | 4/2010 | Spencer et al. ................ 726/4 |
| 2010/0190513 A1 | 7/2010 | Andreasson |
| 2010/0241687 A1* | 9/2010 | Shein et al. ................. 709/203 |
| 2010/0253508 A1 | 10/2010 | Koen et al. |
| 2011/0154130 A1* | 6/2011 | Helander et al. .............. 714/48 |
| 2011/0154473 A1 | 6/2011 | Anderson et al. |
| 2011/0162072 A1 | 6/2011 | Hay et al. |
| 2011/0238476 A1 | 9/2011 | Carr et al. |
| 2011/0238514 A1 | 9/2011 | Ramalingam et al. |
| 2012/0023377 A1* | 1/2012 | Garskof ........................ 714/48 |
| 2012/0079582 A1 | 3/2012 | Brown et al. |
| 2012/0100872 A1 | 4/2012 | Alizadeh-Shabdiz et al. |
| 2012/0116925 A1* | 5/2012 | Jamkhedkar et al. ......... 705/27.1 |
| 2012/0124640 A1* | 5/2012 | Bender et al. .................. 726/1 |
| 2012/0130817 A1 | 5/2012 | Bousaleh et al. |
| 2012/0131143 A1* | 5/2012 | Nakazawa ................... 709/218 |
| 2012/0167185 A1 | 6/2012 | Menezes et al. |
| 2012/0172019 A1 | 7/2012 | Scott et al. |
| 2012/0242511 A1 | 9/2012 | Morgan et al. |
| 2012/0311689 A1* | 12/2012 | Kron ............................. 726/9 |
| 2012/0324568 A1* | 12/2012 | Wyatt et al. .................. 726/13 |
| 2013/0019308 A1* | 1/2013 | Meliksetian et al. ......... 726/22 |
| 2013/0091452 A1 | 4/2013 | Sorden et al. |
| 2013/0145361 A1* | 6/2013 | Kaegi ......................... 717/176 |
| 2013/0178233 A1 | 7/2013 | McCoy et al. |
| 2013/0179275 A1 | 7/2013 | Harb |
| 2014/0047524 A1* | 2/2014 | Auger .......................... 726/7 |
| 2014/0129450 A1* | 5/2014 | Priebatsch .................... 705/44 |

FOREIGN PATENT DOCUMENTS

| | | |
|---|---|---|
| JP | 2001-256398 | 9/2001 |
| JP | 2002-304562 | 10/2002 |
| JP | 2003-006543 | 1/2003 |
| JP | 2003-091678 | 3/2003 |
| JP | 2003-115001 | 4/2003 |
| JP | 2003-203084 | 7/2003 |
| JP | 2003-296625 A | 10/2003 |
| JP | 2004-078674 | 3/2004 |
| JP | 2004-157499 | 6/2004 |
| JP | 2004-272463 | 9/2004 |
| WO | EP 2158784 A2 | 12/2008 |

OTHER PUBLICATIONS

Jin, Yan et al., "A Novel Packet Queuing and Scheduling Algorithm and Its Link Sharing Performance for the Home Internet Gateway," 2009, IEEE, p. 1565-1568.*

Weng et al., "Multimedia Wireless Link Controlled Sharing with Class-Based Packet Scheduling," 2004, IEEE, vol. 1, p. 236-241.*

Wyk et al., "Context-Aware Scanning for Parsing Extensible Languages," Oct. 2007, ACM, p. 63-72.*

Time-Limited Coupons and Tickets for Wearable Display, with Peer-to-Peer Replication, IP.Com, pp. 1-5, Jun. 17, 2004.

Kolmel et al., Real Life Scenarios of Location Based Advertising, pp. 1-9, Jan. 1, 2003.

Nguyen, M., Office Action issued in copending U.S. Appl. No. 13/786,416, filed Mar. 5, 2013, pp. 1-15, Jun. 18, 2013.

Sivji, N., Office Action issued in copending U.S. Appl. No. 13/931,751, filed Jun. 28, 2013, pp. 1-22, Sep. 16, 2013.

Spilling et al., Performance Enhancement in Cellular Networks with Dynamic Cell Sizing, IEEE, pp. 1589-1593, Jan. 1, 2000.

Stikeman, A., Biometrics, Technology Review, vol. 104 (1), pp. 106-107, Jan. 1, 2001.

Ahn, "International Search Report and Written Opinion issued in Appl. No. PCT/US2013/070206", Mar. 6, 2014, 1-10.

* cited by examiner

CLIENT TOKEN STORAGE FOR CROSS-SITE REQUEST FORGERY PROTECTION

TECHNICAL FIELD

The present disclosure relates to systems and methods for securing against forged cross-site requests and, more particularly, to client-side token storage for protection against cross-site request forgeries in the context of browser redirections.

BACKGROUND

Cross-site request forgery ("XSRF") is a type of web exploit where an attacker attempts to perform actions on behalf of an authenticated user without the knowledge of the authenticated user. The attack generally involves creating malicious web content. When a victim browses the malicious web content, the victim's browser is caused to issue an attacker-controlled request to a third-party web service. If the victim is authenticated to the third-party service, the request will be sent with the browser's cookies or other authentication. Having the victim's authentication in place, the malicious code can execute undesirable actions on behalf of the victim at the third-party service. These undesirable actions may be carried out without the victim's consent. As examples, where the third-party web service is a blog system or an email system, the undesirable actions could include deleting or modifying a blog, or adding an email-forwarding rule.

In a web-based system where one service redirects to another service (for example to complete a login process or payment transaction), the functionality for returning from the redirection service and jumping back into the original service creates a window for XSRF attacks. These attacks may involve calling into the return page as though a legitimate use is simply returning from a redirection. There is a need in the art for effectively protecting against cross-site request forgeries, particularly in the context of browser redirections.

SUMMARY

In certain example embodiments described herein, methods and systems can secure against cross-site request forgery using client-side token storage. A client browser can initiate an action associated with a first web service and generate a token. The token may be stored in client-side storage at the computing device. An indicator of the action may also be stored within the client-side storage. A return link, associated with a passed copy of the token, may be generated. The client may perform the redirect and return to the first web service according to the return link. The passed copy of the token can be extracted from the return link. The indicator of the action and the stored token may be loaded from the client storage. The passed copy of the token and the stored token may be compared. The action according to the indicator of the action may be performed in response to the comparison matching.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable cross-site request forgery protection using client-side token storage. A web-based system may temporarily redirect from a first web service to a second web service. This redirection may occur, for example, to complete a login process or payment transaction at the second web service prior to continuing operations at the first web service. Code or script associated with the redirection can generate and store a token in a memory or storage associated with the client browser. A copy of the token may also be passed through the redirection process. An indicator of the next requested action may also be stored in the memory or storage associated with the client browser.

Upon return from the browser redirection, the stored copy of the token and the passed copy of the token may be compared. The comparison may be required to show a match before the next action is processed. The next action may also be verified to match the indicator of the next requested action that was stored at the client. Thus, it may be required that only an action originally requested by the client browser be processed. It may also be required that the return entry point be accompanied by a matching copy of a token that was previously stored with the client.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
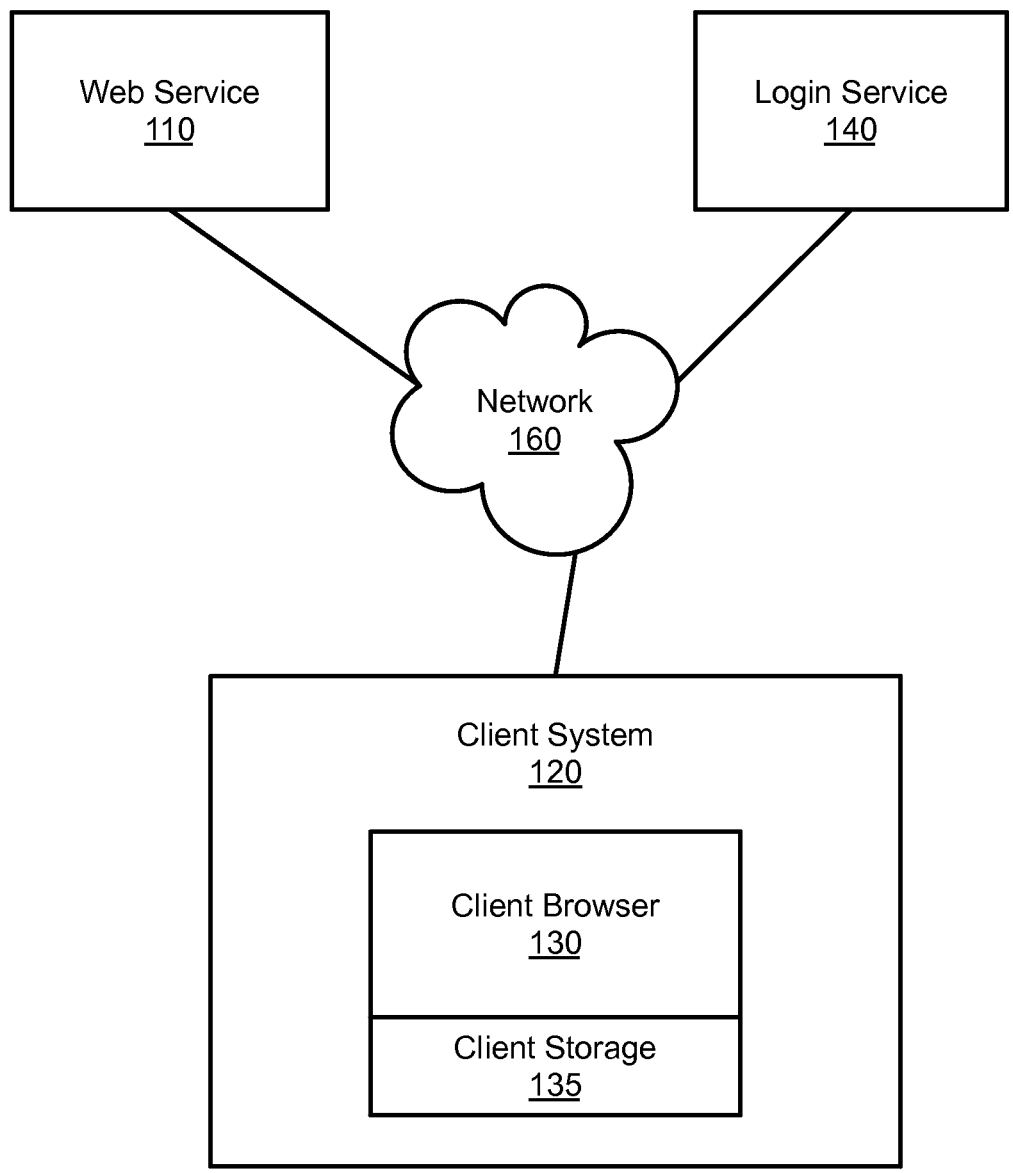
FIG. 1 is a block diagram depicting a cross-site request forgery protected system using web browser client-side storage in accordance with one or more embodiments presented herein.

FIG. 1 is a block diagram depicting a cross-site request forgery ("XSRF") protected system 100 using web browser client-side storage in accordance with one or more embodiments presented herein. The XSRF protected system 100 includes a client system 120 running a client browser 130. The client browser 130 can temporarily redirect from browsing/executing scripts associated with a web service 110 to browse to a login service 140 and then back to the web service 110. During such browser redirections, tokens and other information may be maintained within client storage 135 associated with the client browser 130.

Figure 4:
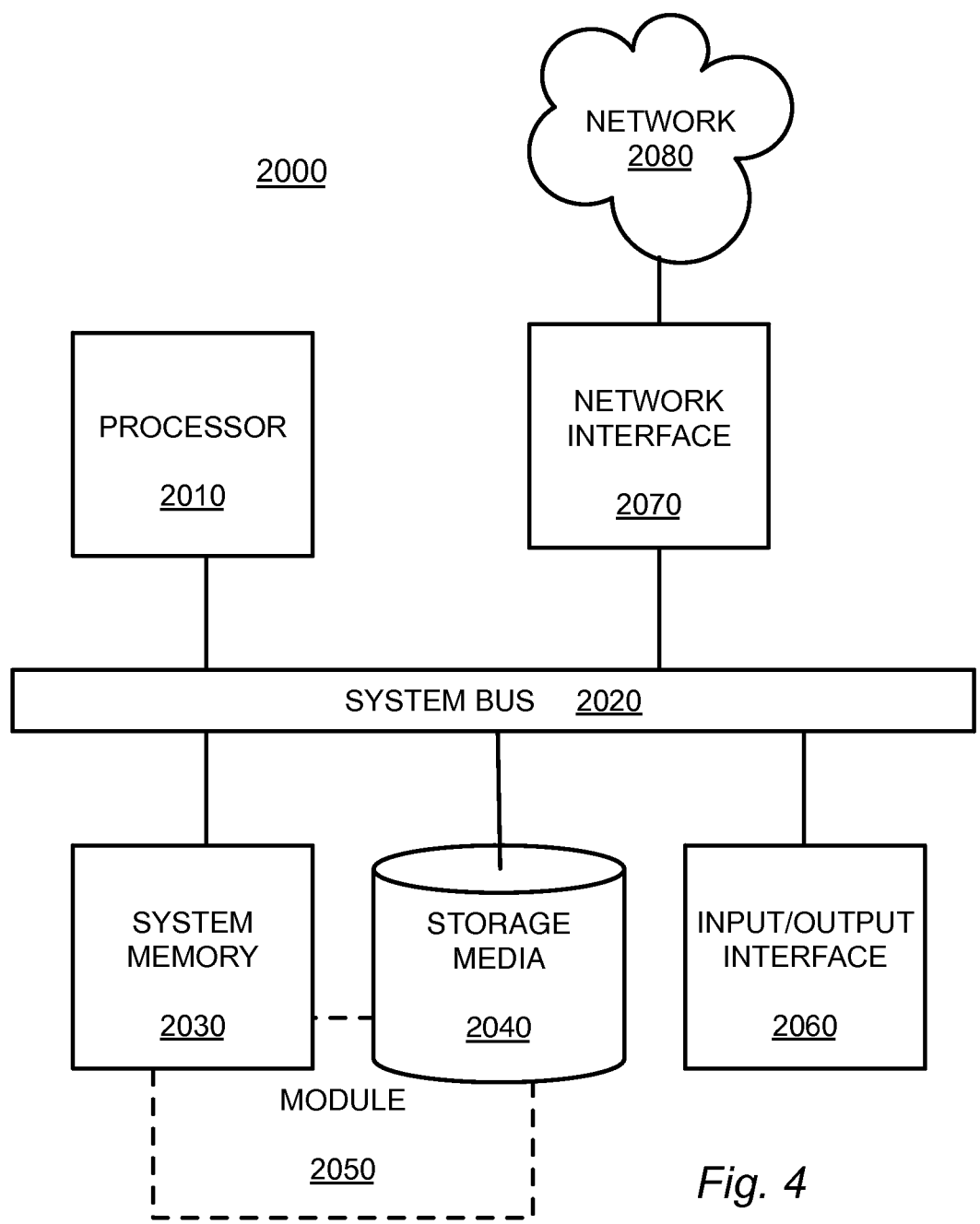
FIG. 4 is a block diagram depicting a computing machine and a module in accordance with one or more embodiments presented herein.

The client system 120, one or more systems associated with the web service 110, one or more systems associated with the login service 140, and any other computing machines associated with this technology may be any type of computing machine such as, but not limited to, those discussed in more detail with respect to FIG. 4. Furthermore, any modules associated with any of these computing machines or any other modules (scripts, web content, software, firmware, or hardware) associated with the technology presented herein may by any of the modules discussed in more detail with respect to FIG. 4. The computing machines discussed herein may communicate with one another as well as other computer machines or communication systems over one or more networks such as network 160. The network 160 may include any type of data or communications network including any of the network technology discussed with respect to FIG. 4.

The web service 110 may be any service provided online via a networked web server to be interfaced through a client browser 130. Examples may include a web site, web-based email, online banking, social media systems, and any other software services provided online, as a cloud service, or as a cloud application.

The client browser 130 may be any software configured to execute on the client system 120 computing machine for browsing to, rendering content from, and interacting with, the web service 110, other web services, web sites, or various types of online content. It should be appreciated that according to one or more embodiments, the client browser 130 may be any other application, script, or software capable of interfacing with one or more web servers to perform the network transactions presented herein.

The client storage 135 may be any memory or other storage associated with the client browser 130 for persisting information associated with code or scripts executing in association with the client browser 130. The client storage 135 may be accessible according to a policy. For example, information within the client storage 135 may only be accessible to a given web domain or web site that originally placed the information into the client storage 135. As such, association of the storage with a given web site or web domain may limit access to the client storage 135. Some examples of implementations for client storage 135 may include sessionStorage (e.g., as in HTML 5), localStorage (e.g., as in HTML 5), Flash, cookies, and any other client-side data storage associated with a web browser.

In the illustrated example, the client browser 130 is temporarily redirected to content associated with the login service 140. However, it should be appreciated that any other service may be the destination of the temporary browser redirection and the login service 140 is merely one example.

Figure 2:
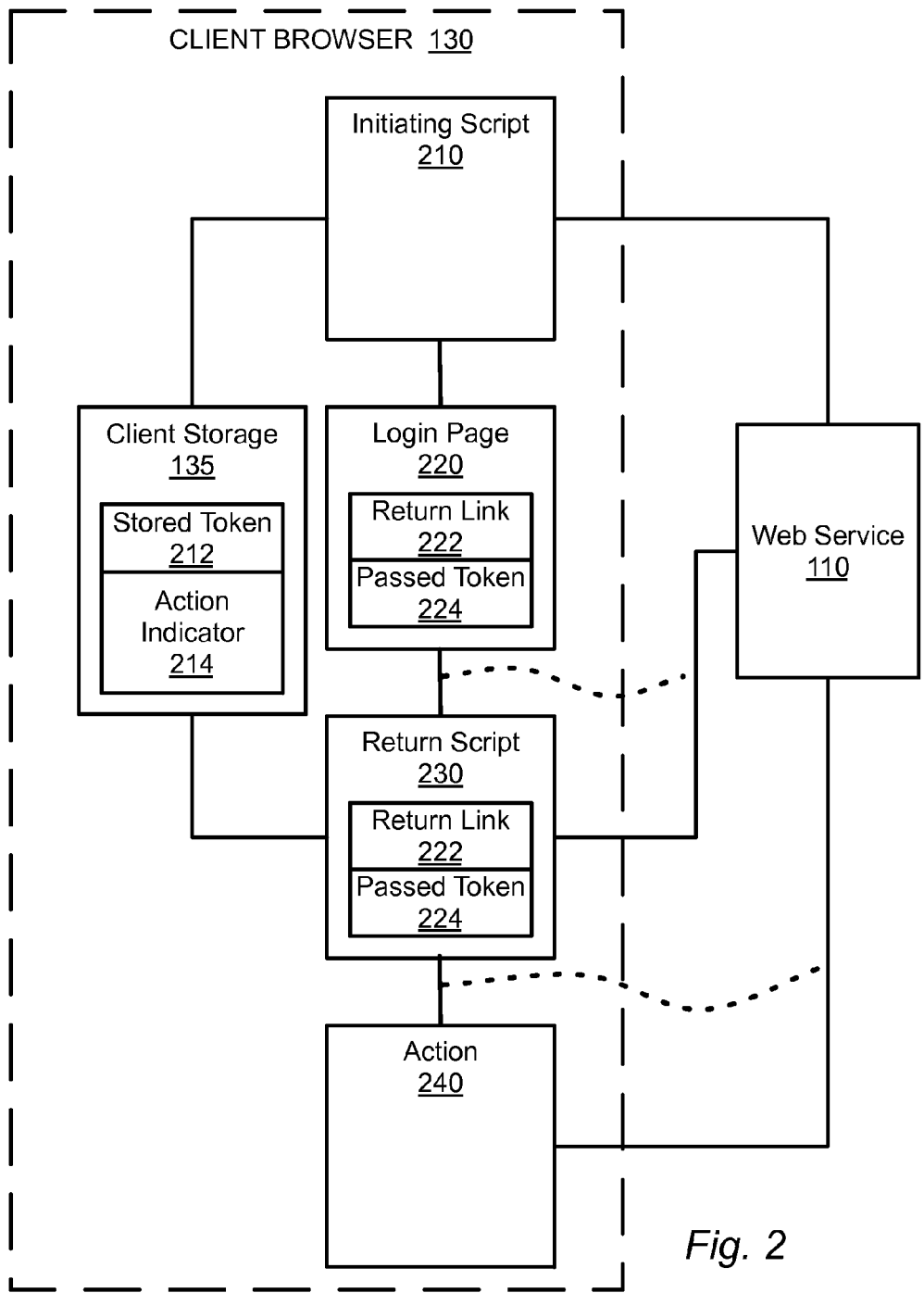
FIG. 2 is a block diagram depicting browser client storage for securing against cross-site request forgery in accordance with one or more embodiments presented herein.

FIG. 2 is a functional block diagram depicting browser 130 client storage 135 for securing against cross-site request forgery, in accordance with certain exemplary embodiments. A client browser 130 may redirect from an initiating script 210, to a login page 220, back to a return script 230, in order to initiate an action 240. The initiating script 210, the return script 230, and the action 240 may be associated with a web service 110.

A return link 222 may be passed to the login page 220 for use when returning from the redirected browsing. The return link 222 may be browsed by the client browser 130 upon completion of features associated with the login page 220 causing the return script 230 to be loaded from the web service 110.

The client browser 130 may generate a token prior to the redirection. The generated token may comprise one or more of a random number, a nonce, a pseudorandom number, a user identifier, client identifier, time stamp, date stamp, or so forth. The token may incorporate encrypted information or other cryptographically protected information. The token may be stored within the client storage 135 as a stored token 212 as well as passed through the redirection as a passed token 224. The passed token 224 may be embedded within, or otherwise transmitted along with, the return link 222. The stored token 212 may be saved to the client storage 135 along with an action indicator 214. The action indicator 214 can store the intended action 240 being initiated from the initiating script 210.

Upon return from the redirected browsing to the return script 230, matching of the stored token 212 and the passed token 224 may be verified. If the passed token 224 and the stored token 212 match, the action indicator 214 (recovered from the client storage 135) may be used to transition the client browser 130 to the action 240. The action 240 may be associated with, or loaded from, the web service 110. According to the token matching verification, the action 240 may only be carried out with the recovery of the previously stored action indicator 214 and stored token 212. Thus, the return from the browser redirection may be trusted as a legitimate redirection and not as the result of a forged cross-site request. Since the action 240 performed is tied to the stored action indicator 214, even where an attacker may somehow have the correct token, the attacker could only perform an action initiated at the client browser 130 and thus stored to the action indicator 214. If the passed token 224 and the stored token 212 do not match, an error message may be displayed, the user may be asked for confirmation of the action 240, a new action may be requested from the user, or various other recovery mechanisms may be performed.

It should be appreciated that transition of the client browser 130 from the login page 220 to the return script 230 may correspond to loading of the return script 230 from the web service 110 to the client browser 130. Accordingly, a dotted-line coupling is illustrated between the loading of the return script 230 from the web service 110 and the client browser transition from the login page 220 to the return script 230.

Similarly, transition of the client browser 130 from the return script 230 to the action 240 may correspond to loading of scripts, code, or other content associated with action 240 being loaded from the web service 110 to the client browser 130. Accordingly, a dotted-line coupling is illustrated between the loading of action 240 from the web service 110 and the client browser transition from the return script 230 to the action 240.

The initiating script 210, the login page 220, the return script 230, and the action 240 may be any form of script, code, or web content and may include hyper-text markup language ("HTML"), JavaScript, Java, Ajax, Flash, other such client-side scripts, or any combination thereof and may be provided via Hypertext Transfer Protocol ("HTTP"), JavaScript Object Notation ("JSON"), Representational State Transfer ("REST"), a remote procedure call ("RPC") mechanism, or any of various other network protocols. This script or code may be loaded from the web server 110 or the login service 140 to the client browser 130 for execution on, or in association with, the client browser 130. It should be appreciated that any combinations of the initiating script 210, the return script 230, and the action 240 may actually share common scripts files configured to execute in different states or contexts.

In the illustrated example, the client browser 130 is temporarily redirected to login page 220 associated with the login service 140. However, it should be appreciated that any other service may be the destination of the temporary redirection and the login service 140 is merely one example. Other services that may be redirected to by the web service 110 may include payment processing services, authentication services, media services, or any other services to which the original web service 110 may need to temporarily redirect and then return. Such redirections may be the targets of forged cross-site request. The techniques presented herein may be useful for protecting against such forged cross-site requests.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 3:
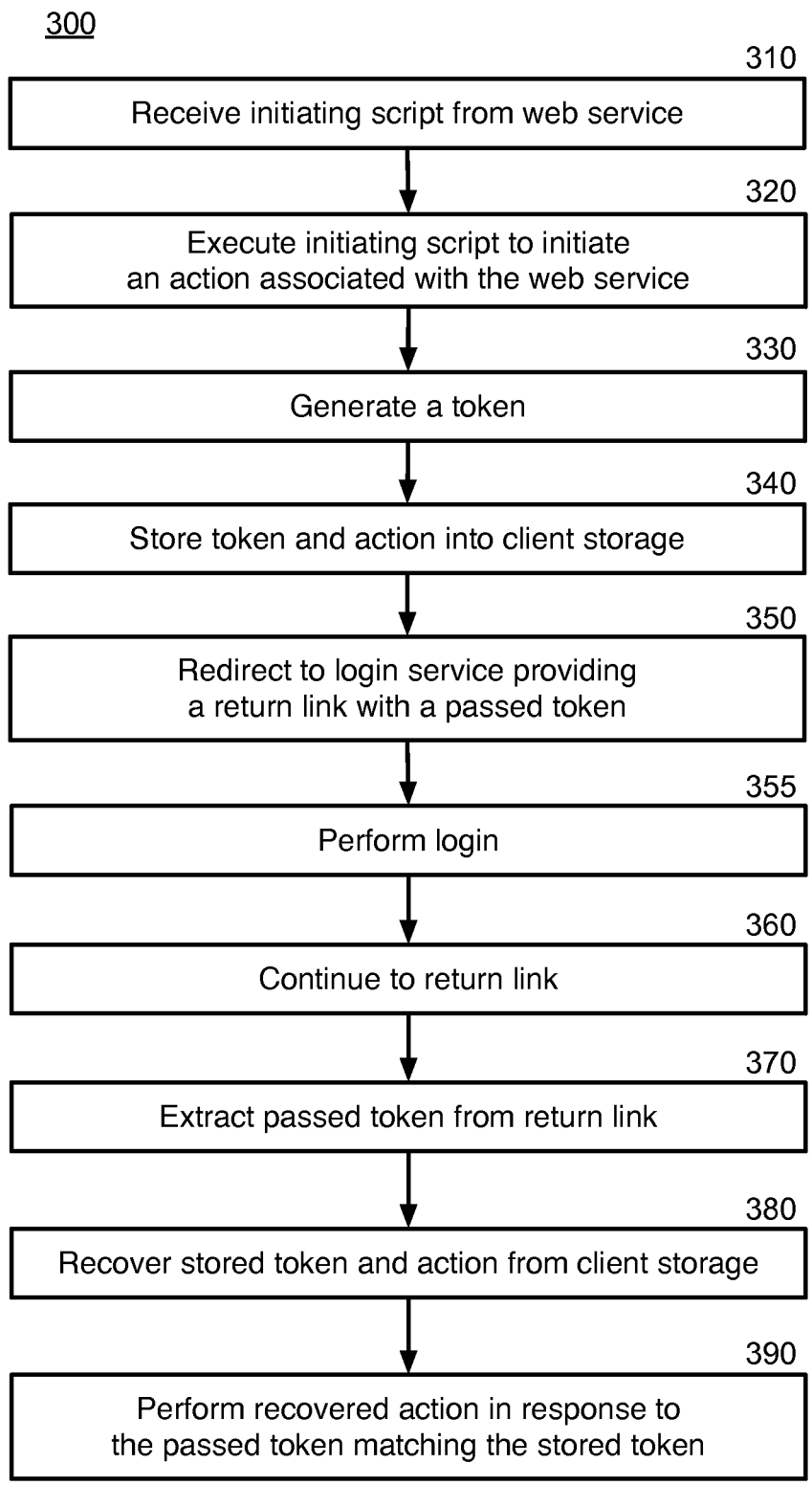
FIG. 3 is a block flow diagram depicting a method for cross-site request forgery protection using client-side token storage in accordance with one or more embodiments presented herein.

FIG. 3 is a block flow diagram depicting a method 300 for cross-site request forgery protection using client-side token storage, in accordance with certain exemplary embodiments.

In block 310, a client browser 130 can receive an initiating script 210 from a web service 110. The initiating script 210 may be delivered in response to the client browser 130 requesting or browsing to a web page, or other content, associated with the web service 110 delivering the initiating script 210.

In block 320, the client browser 130 can execute the initiating script 210 thereby initiating an action 240 associated with the web service 110. Initiation of the action 240 may arise directly according to execution of the initiating script 210. Alternatively, initiation of the action 240 may occur in response to clicking a button, or activating another user interface control, associated with the initiating script 210 at the client browser 130.

In block 330, the initiating script 210, executing in association with the client browser 130, may generate a token. The token may be generated as part of protection against cross-site request forgeries. Such forgery protection may be called upon when the client browser 130 may be redirected away from the web service 110 to another site or web service. One example of another site or web service may be a login service 140. For example, if the action 240 initiated in block 320 requires a user to be logged in, a browser redirection to a login page 220 may be performed prior to performing the action 240. The generated token may comprise one or more of a random number, a nonce, a pseudorandom number, a user identifier, client identifier, or so forth. The token may be generated or combined so as to be unlikely to be guessed by a third-party attacker. The token may include encrypted information.

In block 340, the initiating script 210, executing in association with the client browser 130, may store the token and an action indicator 214 into the client storage 135. The token generated in block 330 may be saved as a stored token 212 into the client storage 135 during the redirection away from the web service 110 to another site or web service. The action indicator 214 can indicate the action 240 being initiated. The action indicator 214 may be saved to the client storage 135 during the redirection away from the web service 110 to another site or web service. The stored token 212 and the action indicator 214 may be maintained within the client storage 135 during the browser redirection. The stored token 212 and the action indicator 214 may be used upon return from the redirection to verify return from a legitimate redirection and not a result of a forged cross-site request.

In block 350, the initiating script 210, executing in association with the client browser 130, may redirect browsing to another service along with a return link 222 and a copy of the token generated in block 330. The return link 222 may be used to return from the redirected browsing. The token may be a copy of the token generated in block 330 and may be provided as a passed token 224. The passed token 224 may be embedded within the return link 222 or the passed token 224 and the return link 222 may be otherwise transmitted together. The illustrated example for the other service is a login service 140 having an associated login page 220 to which the client browser 130 is temporarily redirected for login. However, it should be appreciated that any other service may be the destination of the temporary redirection and the login service 140 is merely one example.

In block 355, the client browser 130 may redirect to the login page 220 to perform the login process. The login page 220 may be provided to the client browser 130 by the login service 140. Again, it should be appreciated that any other service may be the destination of the temporary redirection and the login service 140 is merely one example. The login process associated with the login page 220 may pass through the passed token 224 and the return link 222.

In block 360, the redirection of the client browser 130 (to the login page 220 in the illustrated example) may continue by following the provided return link 222 upon completion. The return link 222 may be browsed to upon completion of the login page 220. The return link 222 may be browsed by the client browser 130 causing a return script 230 to be loaded from the web service 110. The return link may be passed to the client browser 130 along with the passed token 224. The passed token 224 may be embedded within the return link 222.

In block 370, the return script 230, executing in association with the client browser 130, may extract the passed token 224. The passed token 224 may be embedded within the return link 222 or otherwise provided along with the return link 222.

In block 380, the return script 230, executing in association with the client browser 130, may recover the stored token 212 and the action indicator 214 from the client storage 135. The stored token 212 and the action indicator 214 may have been maintained within the client storage 135 during the browser redirection away from the web service 110 to the other site or web service (such as the login service 140 in the illustrated example).

In block 390, the return script 230, executing in association with the client browser 130, may verify that the stored token 212 matches the passed token 224. The action 240 associated with the action indicator 214 may be executed at the client browser 130 in response to the passed token 224 matching the stored token 212. The action 240 may be associated with, or loaded from the web service 110. According to the token matching verification, the action 240 may only be carried out with the recovery of the previously stored action indicator 214 and stored token 212. Thus, the return from the browser redirection may be trusted as a legitimate redirection and not as the result of a forged cross-site request.

After block 390, the method 300 ends. Of course, client-side storage of tokens to protect against XSRF attacks may be continued through repeated, or continual, application of method 300.

Example Systems

FIG. 4 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for securing against cross-site request forgery, the method comprising:
    initiating, by a web browser of a client computing device, an action directed to a first web service;
    generating, by the client computing device, an electronic token for the action;
    redirecting browsing, by the client computing device, to a second web service while providing a passed token copy to the second web service;
    receiving, from the second web service by the client computing device, the passed token copy upon completing, by the client computing device, an operation associated with the second web service;
    determining, by the client computing device, that the received passed token copy matches the generated token; and
    performing, by the client computing device, the action in response to determining that the received passed token copy matches the stored token.

2. The computer-implemented method of claim 1:
    wherein the generated token is stored in session storage associated with the web browser;
    further comprising generating, by the client computing device, a return link associated with a passed token copy of the electronic token, wherein the return link is associated with the first web service; and
    wherein performing the action in response to determining that the passed token copy matches the stored token comprises performing a script initiated by the return link.

3. The computer-implemented method of claim 2, further comprising storing an indicator of the action within the session storage prior to redirecting browsing, reading the indicator of the action from the session storage after returning to the first web service according to the provided return link, and wherein performing the action comprises performance according to the read indicator of the action.

4. The computer-implemented method of claim 1, wherein the second web service is a login authentication service.

5. The computer-implemented method of claim 1, wherein an access policy limits access to information stored within the session storage to the same Internet domain.

6. The computer-implemented method of claim 1, wherein an access policy limits access to information stored within the session storage to the same web site that originally stored the information.

7. The computer-implemented method of claim 1, wherein the electronic token comprises one of a random number, pseudorandom number, user identifier, and time stamp.

8. The computer-implemented method of claim 1, wherein the passed token copy comprises a duplicate of the electronic token to be verified after passing along through the redirected browsing.

9. A system, comprising:
a user computing device associated with a browser; and
a first web service,
where in the user computing device is configured to:
receive, via the browser, initiation of an action directed to the first web service;
generate a token for the initiated action;
redirect browsing to a second web service while providing the passed copy of the token to the second web service;
receive, from the second web service by the user computing device, the passed token copy upon completing an operation associated with the second web service;
determine that the received passed copy of the token matches the generated token; and
perform the action in response to determining that the received passed copy of the token matches the generated token.

10. The system of claim 9
wherein the generated token is stored in session storage associated with the web browser;
further comprising generating, using the user computing device, a return link associated with a passed token copy of the electronic token, wherein the return link is associated with the first web service; and
wherein performing the action in response to determining that the passed token copy matches the stored token comprises performing a script initiated by the return link.

11. The system of claim 10, wherein the user computing device is further configured to store an indicator of the action within the session storage prior to redirecting browsing, read the indicator of the action from the session storage after returning to the first web service according to the provided return link, and wherein performing the action comprises performance according to the read indicator of the action.

12. The system of claim 9, wherein the second web service is one of a login authentication service and a payment service.

13. The system of claim 9, wherein the access policy limits access to information stored within the session storage to the same Internet domain.

14. The system of claim 9, wherein the access policy limits access to information stored within the session storage to the same web site that originally stored the information.

15. The system of claim 9, wherein the token comprises one of a random number, pseudorandom number, user identifier, and time stamp.

16. A computer program product, comprising:
a non-transitory computer-readable medium having computer-readable program code embodied therein that, when executed by a client computing device, performs a method comprising:
initiating, by a browser of the client computing device, an action directed to a first web service;
generating, by the client computing device, a token for the action;
redirecting browsing, by the client computing device, to a second web service while providing the passed copy of the token to the second web service;
receiving, from the second web service by the client computing device, the passed token copy upon completing, by the client computing device, an operation associated with the second web service;
determining, by the client computing device, that the received passed copy of the token matches the generated token; and
performing, by the client computing device, the action in response to determining that the passed copy of the token matches the generated token.

17. The computer program product of claim 16,
wherein the generated token is stored in session storage associated with the web browser;
further comprising generating, by the client computing device, a return link associated with a passed token copy of the electronic token, wherein the return link is associated with the first web service; and
wherein performing the action in response to determining that the passed token copy matches the stored token comprises performing a script initiated by the return link.

18. The computer program product of claim 17, wherein the method further comprises storing an indicator of the action within the session storage prior to redirecting browsing, reading the indicator of the action from the session storage after returning to the first web service according to the provided return link, and wherein performing the action comprises performance according to the read indicator of the action.

19. The computer program product of claim 16, wherein the second web service is one of a login authentication service and a payment service.

20. The computer program product of claim 16, wherein the access policy limits access to information stored within the session storage to the same web site that originally stored the information.

21. The computer program product of claim 16, wherein the token comprises one of a random number, pseudorandom number, user identifier, and time stamp.

* * * * *